(12) United States Patent
Franks et al.

(10) Patent No.: US 8,681,463 B2
(45) Date of Patent: Mar. 25, 2014

(54) CIRCUIT BREAKER PANEL

(75) Inventors: Jeffrey L. Franks, Tomball, TX (US);
Stephen E. Williams, Spring, TX (US);
Ray Cole, Spring, TX (US)

(73) Assignee: Edison Global Circuits, LLC, Spring, TX (US)

( * ) Notice: Subject to any disclaimer, the term of this patent is extended or adjusted under 35 U.S.C. 154(b) by 0 days.

(21) Appl. No.: 13/574,946

(22) PCT Filed: Jan. 25, 2011

(86) PCT No.: PCT/US2011/022438
§ 371 (c)(1),
(2), (4) Date: Jul. 24, 2012

(87) PCT Pub. No.: WO2011/091429
PCT Pub. Date: Jul. 28, 2011

(65) Prior Publication Data
US 2012/0300348 A1 Nov. 29, 2012

Related U.S. Application Data

(60) Provisional application No. 61/298,104, filed on Jan. 25, 2010, provisional application No. 61/298,018, filed on Jan. 25, 2010.

(51) Int. Cl.
*H02H 9/08* (2006.01)

(52) U.S. Cl.
USPC .................................................. 361/93.2

(58) Field of Classification Search
USPC .................................................. 361/93.2
See application file for complete search history.

(56) References Cited

U.S. PATENT DOCUMENTS

| | | | |
|---|---|---|---|
| 2003/0171039 A1* | 9/2003 | Pierson, Jr. | ............ 439/709 |
| 2005/0043861 A1 | 2/2005 | Thompson | |
| 2005/0243491 A1* | 11/2005 | Tanis | ............ 361/104 |
| 2006/0087782 A1* | 4/2006 | Michalko et al. | ............ 361/62 |
| 2006/0279884 A1 | 12/2006 | Valdes et al. | |
| 2007/0223160 A1* | 9/2007 | Coffey et al. | ............ 361/62 |
| 2008/0316004 A1* | 12/2008 | Kiko | ............ 340/310.13 |
| 2009/0021879 A1 | 1/2009 | Rivers, Jr. et al. | |

OTHER PUBLICATIONS

International Application No. PCT/US2011/022438 Search Report and Written Opinion dated Sep. 26, 2011.

* cited by examiner

*Primary Examiner* — Jared Fureman
*Assistant Examiner* — Kevin J Comber
(74) *Attorney, Agent, or Firm* — Thompson & Knight, LLP; James J. Murphy

(57) ABSTRACT

In at least some embodiments, a system includes a plurality of circuit breakers and trip control logic external to and coupled to the circuit breakers. The trip control logic enables a plurality of different tripping options to be selected for each of the circuit breakers.

18 Claims, 4 Drawing Sheets

CIRCUIT BREAKER PANEL

CROSS-REFERENCE TO RELATED APPLICATIONS

This application is the U.S. National Stage under 35 U.S.C. §371 of International Patent Application No. PCT/US2011/022438 filed Jan. 25, 2011, which claims priority to: U.S. Provisional Patent Application No. 61/298,018 filed Jan. 25, 2010, entitled "Circuit Breaker Panel Box"; and U.S. Provisional Patent Application No. 61/298,104 filed Jan. 25, 2010, entitled "Circuit Breaker Panel Box With Communication Gateway". The above priority documents are hereby incorporated herein by reference in their entirety.

STATEMENT REGARDING FEDERALLY SPONSORED RESEARCH OR DEVELOPMENT

Not applicable.

BACKGROUND

Circuit breakers provide an automatic switching mechanism that responds to fault conditions (e.g., overload or short circuit) by interrupting continuity of a circuit to discontinue electrical flow. Arc-fault circuit interrupt (AFCI) and ground-fault circuit interrupt (GFCI) are newer circuit breaker technologies that respectively detect the fault conditions of arc-fault and ground-fault. Typically, a circuit breaker panel includes many circuit breakers, each protecting a different branch circuit. The implementation of different fault detection technologies for different circuit breakers of a circuit breaker panel is not a trivial task.

SUMMARY

In at least some embodiments, a system includes a plurality of circuit breakers and trip control logic external to and coupled to the circuit breakers. The trip control logic enables a plurality of different tripping options to be selected for each of the circuit breakers.

In at least some embodiments, a circuit breaker panel includes fault detection logic within each of a plurality of circuit breakers associated with the circuit breaker panel. The circuit breaker panel also includes trip control logic coupled to each fault detection logic and located exterior to the plurality of circuit breakers. The trip control logic enables a plurality of different tripping options to be selected for each of the circuit breakers.

BRIEF DESCRIPTION OF THE DRAWING+S

For a detailed description of exemplary embodiments of the invention, reference will now be made to the accompanying drawings in which.

NOTATION AND NOMENCLATURE

Figure 1:
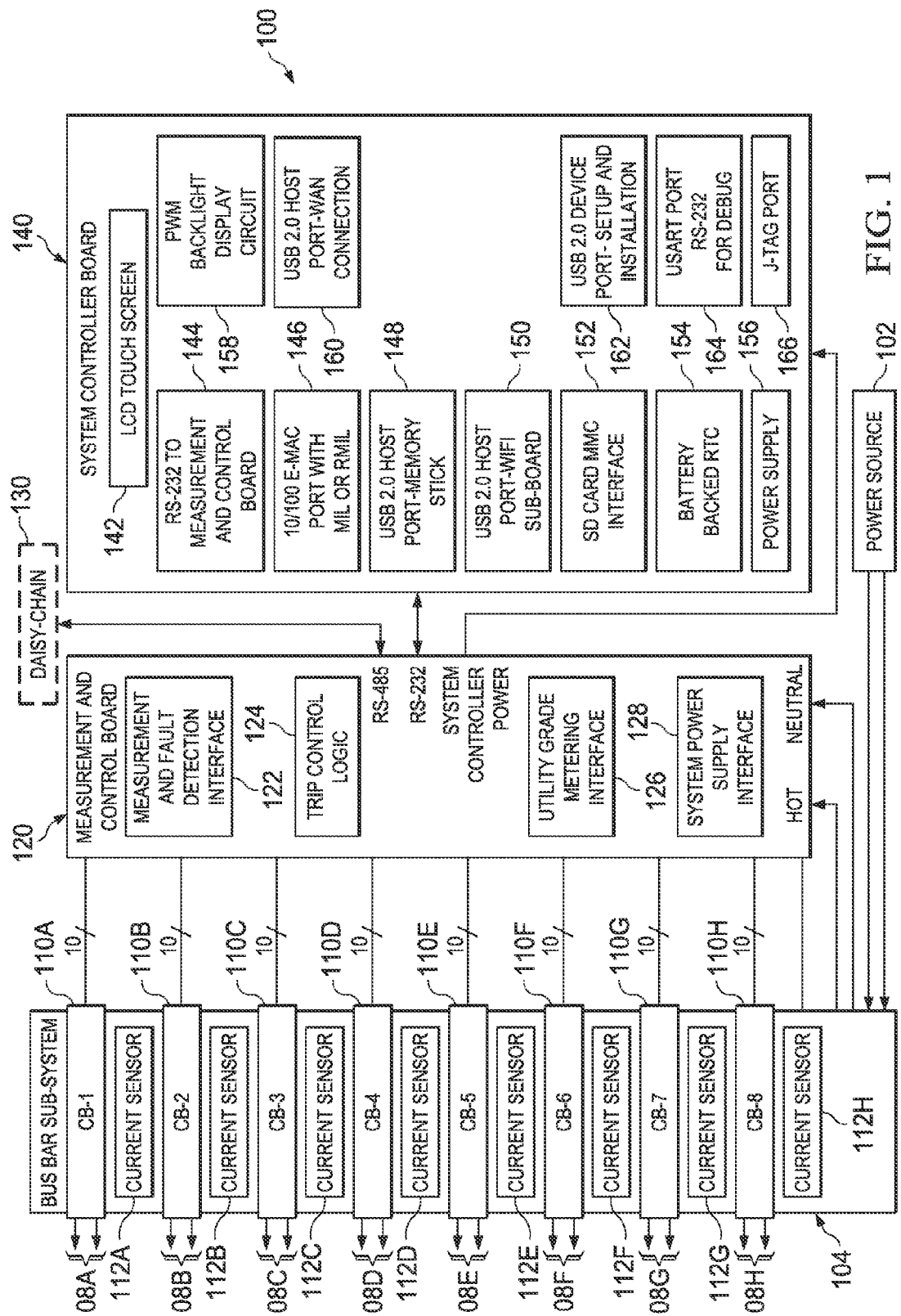
FIG. 1 shows a system in accordance with an embodiment of the disclosure.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are methods and systems for providing dynamic control of tripping options for a plurality of circuit breakers. Also disclosed herein is a circuit breaker panel configuration that facilitates interaction between a user and the circuit breaker panel and/or between an electricity utility provider and the circuit breaker panel. Also disclosed herein is a circuit breaker panel configuration that enables multimedia/internet transmissions to be received via the circuit breaker panel. Additionally, at least some embodiments of the disclosed circuit breaker panel configuration provide an interface for communications between a user and electrical appliances powered via the circuit breaker panel.

In at least some embodiments, a circuit breaker panel provides overload protection for an eight branch circuit protection product. The circuit breaker panel may be a 60 Amp service box with 20 Amp circuit breakers. The following items make up the basic foundation for the disclosed circuit breaker panel: 1) an electrical panel box providing 60 Amp, single phase service, 120VAC/240VAC 50/60 Hz; 2) branch circuit over-current protection devices (circuit breakers) that have a remote trip capability; 3) circuit breakers that provide stand-alone circuit protection based upon bi-metal trip actuation; 4) sensors that are integrated into the circuit breakers for ground fault event detection and/or arc fault event detection; 5) circuit breakers that are single pole devices rated for 120VAC/240VAC, 50/60 Hz, 20 Amp; 6) circuit breakers that fit into a plastic enclosure (referred herein as a "circuit breaker nest") designed to hold up to eight circuit breakers; 7) electrical bus bars and shunt measurement sensors that are integrated into a measurement and control board described herein which may be located in the circuit breaker nest; 8) circuit breakers that make connection to the line-side electrical bus bars without exposure to the user; and 9) circuit breakers that mate with remote sensing and control connectors located on the measurement and control board.

The items listed above can be tested as a stand-alone system to provide basic branch circuit over-load protection. This configuration is not dependent on use the measurement and control board described herein except for those elements that make up the bus bar system and main electrical connections. Various auxiliary features may be added to the branch circuit over-protection configuration of the circuit breaker panel.

These auxiliary features include: 1a) the circuit breaker nest is improved to include two fully populated circuit boards (a measurement and control board, and a system controller board) for control, measurement, sensing, and user interface options; 1b) smart circuit breaker functionality is utilized to implement Ground-Fault Circuit Interrupt (GFCI) and Arc-Fault Circuit Interrupt (AFCI) capability); 2) the measurement and control board, and the system controller board are sealed inside the nest such that they become tamper proof; 3) the measurement and control board provides high quality electrical utility metrology functions for total power and also enables branch circuit measurement/control to become functional; 4) the system controller board provides the Human Machine Interface (HMI) using a display (e.g., a TFT touch screen); 5) the display has an integrated touch screen that is utilized to setup and observe auxiliary features that specialize each branch circuit; 6) the display provides status, time, power measurement information, plus a means for testing auxiliary functions; 7) the display shows circuit events, fault detection, and fault characterization (e.g., over-current, ground-fault, arc-fault, line spikes, brown-out, quality of power); 8) use of the HMI for setup by installation personnel to add functionality such as branch circuit characterization (name, usage, etc.), branch circuit prioritization, and branch circuit enabled features (GFCI, AFCI, etc.).

In at least some embodiments, the disclosed circuit breaker panel (e.g., using the system controller board) provides a gateway into the home from a communications provider. This can be by means of a hard copper connection, fiber optics, cell tower, or proprietary WAN. Protocols handle remote logging and control by means of the communications connectivity, irrespective of the connecting means. One implementation of the communications gateway is by use of a communications module that is supplied by the communications provider. This communication module connects to the system controller board, for example, via a USB 2.0 connection. In at least some embodiments, the communications module is set up by the provider in order to complete a radio frequency (RF) interface compatible with cell tower protocols. This equipment provides at least 3G and possibly 4G service, if available. This communication module is mounted on the outside of the house and connects to the system controller board via a USB 2.0 cable through the wall of the house.

Some of the communication features supported by the disclosed circuit breaker panel are as follows: 1) provide high-speed streaming services (WAN); 2) route communications to end-point appliances in a Home Area Network (HAN) via the system controller board; 3) provide functionality for VoIP, streaming video, streaming audio and/or internet connectivity; 4) provide connectivity from/to the electric utility provider; 5) add utility provider functionality for remote meter reading, control of power to the residence (turn power on or off), demanding side power control (control branch circuits based on priority and usage), provisioning time-of-use metrology information, supporting VPN and SCADA protocols to secure the connections and communications platform and format that the electric utility provider uses, supporting supervisory protocols whereby information can be sent either direction, supporting use of supervisory information for multiple purposes, none of which are mutually exclusive of each other (e.g., for logging, metering and/or control); 6) use of the HMI for setup by a communications provider and/or an electric utility provider; 7) user of the HMI for communications setup (e.g., routing, IP address, GPS co-ordinates, SIM setup, credentials, VPN, and elements of the Home Area Network (HAN)); 8) use of the HMI for electric utility setup (e.g., customer account number, credentials, VPN, SCADA setup); and 9) end-point wireless connectivity to devices inside the house is accomplished by means of sub-boards (WiFi and/or ZigBee communication boards) that are attached to the system controller board. The sub-boards provide various features as follows: 1) the system controller board contained in the circuit breaker nest is configured with the appropriate sub-board(s) to enable additional end-point wireless communications inside the house; and 2) various end-point communications are supported including: VoIP (telephone), streaming audio (music), streaming video (TV), internet connections (laptop computer), and smart-box connections (laptop computer)

FIG. 1 shows a system 100 in accordance with an embodiment of the disclosure. As shown, the system 100 comprises a plurality of circuit breakers 106A-106H coupled to a bus bar sub-system 104. For each circuit breaker 110A-110H, current sensor logic 112A-112H is also provided. Each circuit breaker 110A-110H provides fault protection for a corresponding branch circuit 108A-108H that receives power from power source 102.

In FIG. 1, each circuit breaker 110A-110H couples to trip control logic 124. In at least some embodiments, the trip control logic 124 is mounted to a measurement and control board 120. The measurement and control board 120 includes, for example, a measurement and fault detection interface 122 through which power sense signals and fault sense signals are received from the circuit breakers 110A-110H.

The trip control logic 124 operates to provide a default (e.g., overload) tripping option, an arc-fault circuit interrupt (AFCI) tripping option, a ground-fault circuit interrupt (GFCI) tripping option, and a AFCI/GFCI tripping option for each of the circuit breakers 110A-110H. In at least some embodiments, the tripping option for each circuit breaker 110A-110H is selectable by a user via a user interface (e.g., touch screen 132) in communication with the trip control logic 124. The tripping option for each circuit breaker 110A-110H could also be selected via a local or remote computing device configured to communicate with the trip control logic 124.

As shown, the measurement and control board 120 also comprises utility grade metering logic 126 that determines power consumption information for the system 100 and that organizes, formats, and selectively transmits the power consumption information to a utility metering collection site (not shown). The measurement and control board 120 also comprises a power supply interface 128 that outputs different voltage levels for different components of the system 100. For example, the trip control logic 124 and the utility grade metering logic 126 may operate using different voltage levels. The power supply interface 128 also may provide power to components of a system controller board 140 in communication with the measurement and control board. In at least some embodiments, the measurement and control board 120 and the system controller board 140 communicate via a RS-232 interface. Further, multiple measurement and control boards 120 may be daisy-chained 130 (e.g., via a RS-485 interface) as needed to support additional circuit breakers. In this manner, the total number of circuit breakers in the system 100 can be extended as needed by replicating the measurement and control board 120 operations (trip control loop functionality) for additional circuit breakers. Even if the number of measurement and control boards 120 increases, only one system controller board 140 need be used for system 100.

As shown, the system controller board 140 comprises a touch screen 142 (e.g., a TFT touch screen or other touch screen technology). The touch screen 142 displays information to a user and also enables a user to interact with control features of the system 100 and/or to request information regarding the system 100. As previously mentioned, a user/administrator should be able to set (and dynamically update) a default tripping option, an arc-fault circuit interrupt (AFCI) tripping option, a ground-fault circuit interrupt (GFCI) tripping option, and a AFCI/GFCI tripping option for each of the circuit breakers of system 100. The system controller board 140 also comprises a pulse width modulation (PWM) backlight display circuit 158 that enables adjustment of the backlight intensity used to illuminate the touch screen 142.

The system controller board 140 also comprises several communication interfaces including: a RS-232 interface 144 to support communications with the measurement and control board 120; a 10/100 E-MAC port 146 with media independent interface (MII) or reduced media independent interface (RMII); a USB 2.0 host port 148 with memory stick compatibility; a USB 2.0 host port 150 for optional communications to a WiFi daughter board; a Secure Digital (SD) card multimedia card (MMC) interface 152; a USB 2.0 host port 160 for Wide Area Network (WAN) connectivity; a USB 2.0 device port 162 for setup and installation of control software/firmware of the system 100; a universal asynchronous receiver/transmitter (USART) port 164 compatible with RS-232 for debugging control software/firmware of the system 100; and a J-TAG port 166 for test and debug operations. The system controller board 140 also comprises a power supply interface 156 to adjust power supply voltage levels for different components of the system controller board 140. Further, the system controller board 140 comprises a battery-backed real-time clock (RTC) 154 to clock various hardware components of the system controller board 140.

The components of the measurement and control board 120 and the system controller board 140 are examples only and are not intended to limit embodiments of the disclosure to particular communication interfaces or control schemes. In general, each measurement and control board 120 provides a trip control loop for up to a predetermined number of circuit breakers (e.g., 8 circuit breakers). The trip control loop is implemented with circuit breakers that are able to sense all fault conditions that could be used to trigger tripping of a circuit breaker. In order to customize the tripping conditions for circuit breakers that are able to detect a plurality of fault conditions, the fault sense signals and power sense signals detected by the circuit breakers are passed to the trip control loop, which manages the specific trip conditions for each circuit breaker separately. In this manner, the tripping conditions for each of a plurality of circuit breakers (e.g., 110A-110H), providing fault protection for different branch circuits (e.g., branch circuits 108A-108H), can be customized and updated as needed.

Meanwhile, the system controller board 140 provides user interface options and communication features that enhance the role of a circuit breaker system or panel. For example, the user interface features of system controller board 140 are used to provide power consumption information, appliance management, and circuit breaker management to a user/administrator of the system 100. Meanwhile, the communication features of system controller board 140 enable testing, debugging, endpoint communications with appliances, communications with electrical receptacles and/or receipt of multimedia services (e.g., internet, VOIP, television, streaming radio/audio, etc.) for a home area network (HAN).

In some embodiments, the trip control loop components of measurement and control board 120 could be combined with the user interface features and/or the communication features of system controller board 140 on a single control board. In general, the trip control loop components, the user interface features and the communication features described herein could be spread across multiple control boards in different ways without changing the operations of system 100. Further, the user interface features and the system controller board 140 described herein does not exclude the possibility of managing features of the system 100 using a separate computer system or portable control device configured to communicate with control logic of the system 100. In other words, a user/administrator of system 100 could manage features of the system 100 using a pre-integrated user interface (e.g., touch screen 142), a separate user interface (e.g., a computing device running appropriate software), or both.

In at least some embodiments, the management of features for system 100 could be divided into user-managed features and administrator-managed features. In other words, there may be features of system 100 that only an end user (e.g., a home owner) should be able to access. For example, a user may select color and style options for the HMI, enable/disable an audible notification for non-critical events (advertisements), set feedback criteria regarding power consumption for branch circuits and the entire system. Furthermore, there may be other features of system 100 that only a system installer (e.g., an electrical contractor) should be able to access. For example, the system installer can name the branch circuits, set priorities for branch circuits and/or set tripping options for each branch circuit. Furthermore, there may be other features of system 100 that only a communication provider should be able to access. For example, the communication provider sets up time zone information, GPS coordinates, network time protocols, VPN options, authentication credentials for the communication provider, enable/disable features of the system (fire/police/emergency response options). Furthermore, there may be other features of system 100 that only an electric utility provider should be able to access. As an example, an electric utility provider may set up account numbers, SCADA access information, credentials for later access (username/password), routing information for communications (e.g., VPN options).

In at least some embodiments, the electric utility provider is able to access system 100 remotely to collect power consumption information and/or to selectively trip circuit breakers of system 100. In at least some embodiments, if the electric utility provider trips a circuit breaker, the trip control logic 124 causes the circuit breaker to continue tripping (manually resetting of the circuit breaker switch is ineffective) until the electric utility provider signals to the trip control logic 124 that use of the tripped circuit breaker is allowed. In this manner, the electric utility provider can prevent misuse of the system 100, or even misuse of individual circuit breakers and their corresponding branch circuits.

Figure 2:
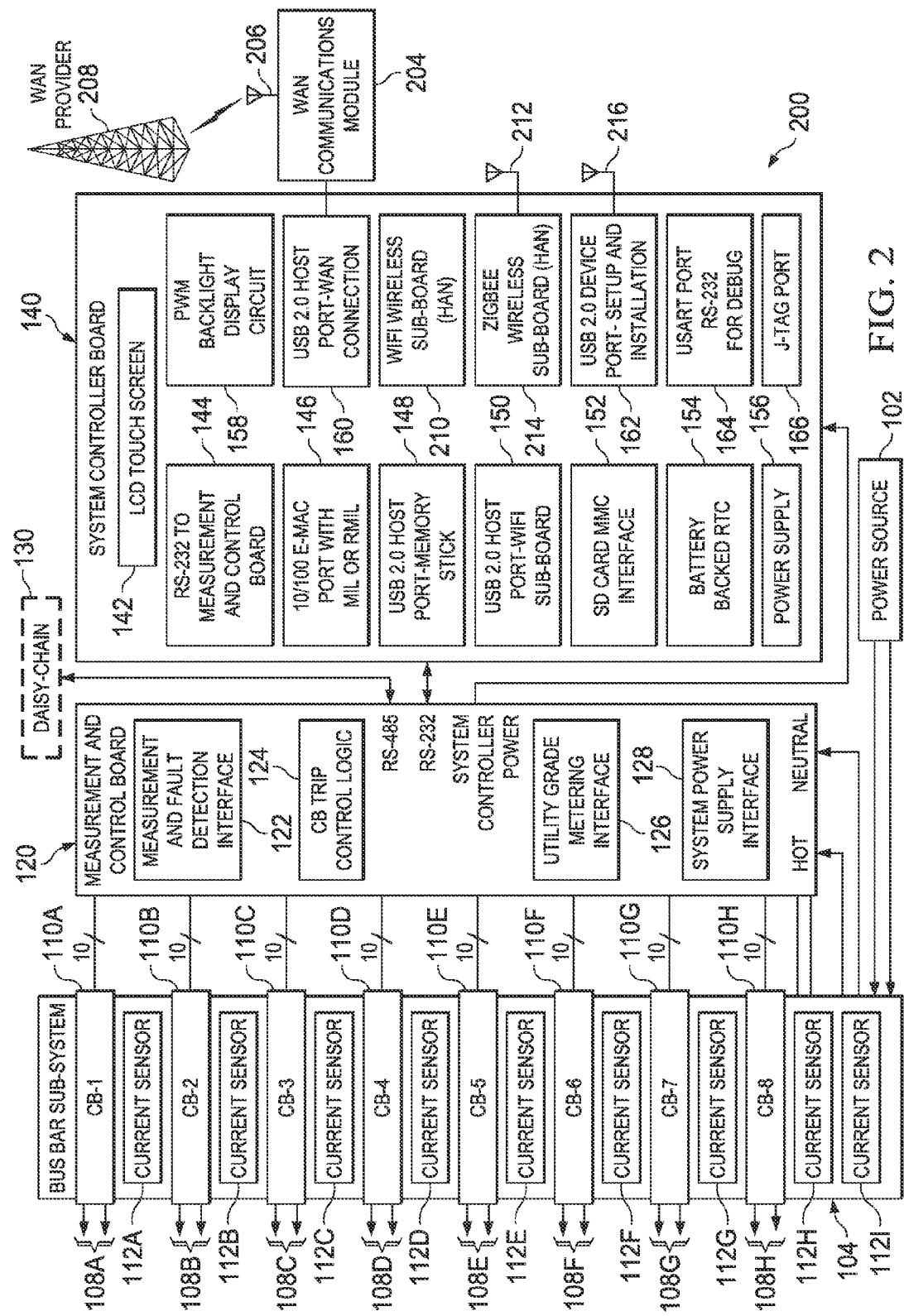
FIG. 2 shows a system in accordance with another embodiment of the disclosure.

FIG. 2 shows a system 200 in accordance with another embodiment of the disclosure. The system 200 of FIG. 2 is similar to the system 100 of FIG. 1, but shows additional communication features. In FIG. 2, the system 200 comprises a WAN communications module 204 with antenna 206 coupled to the USB 2.0 host port 160 for Wide Area Network (WAN) connectivity. In this manner, the WAN communication module 204 and antenna 206 enable communications with WAN provider 208.

System 200 also shows the addition of a WiFi wireless sub-board 158 with antenna 160 to the system controller board 140. The WiFi wireless sub-board 158 enables communications for home area network (HAN) services. System 200 also shows the addition of a ZigBee wireless sub-board 162 with antenna 164 to enable communications with compatible electrical appliances and receptacles.

Figure 3:
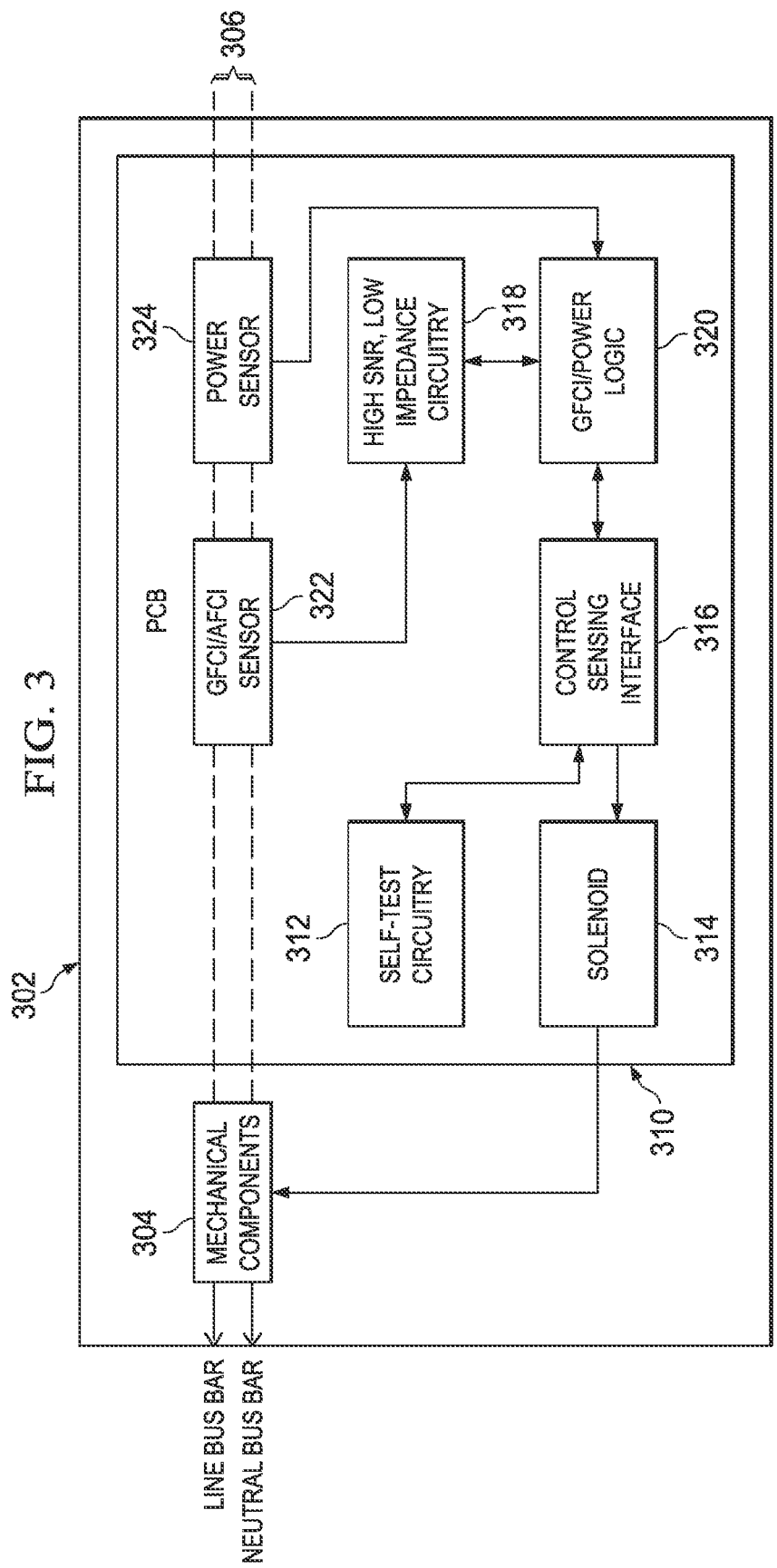
FIG. 3 shows a block diagram of a circuit breaker in accordance with an embodiment of the disclosure.

FIG. 3 shows a block diagram of a circuit breaker 302 in accordance with an embodiment of the disclosure. The circuit breaker 302 comprises mechanical components 304 that selectively break continuity of a branch circuit 306. In at least some embodiments, the mechanical components 304 couple to a line bus bar and a neutral bus bar without wires (i.e., direct contact between conductors corresponding to the at least some of the mechanical components 306 and with both the line bus bar and the neutral bus is made possible). The mechanical components 304 are activated by a solenoid 314 that can be triggered using electrical control signals. Once the mechanical components 304 are "tripped" (breaking the continuity of branch circuit 306) by energizing the solenoid 314, the mechanical components 304 have to be manually reset to restore continuity to the branch circuit 306.

In at least some embodiments, the circuit breaker 302 comprises GFCI/AFCI sensors 322 and power sensor 324 in-line with the branch circuit 306. The GFCI/AFCI sensors 322 is configured to provide fault sense signals to GFCI/power logic 320 via high signal-to-noise ratio (SNR), low impedance circuitry 318. The high SNR, low impedance circuitry 318 improves the performance of fault detection for circuit breaker 302. Meanwhile, the power sensor 324 provides power sense signals directly to GFCI/power logic 320. With the power sense signals from the power sensor 324 and the fault sense signals from the GFCI/AFCI sensor 322, the GFCI/power logic 320 is able to identify faults including overload faults, AFCI faults and GFCI faults. If GFCI/power logic 320 identifies a fault, a corresponding fault signal is output by the GFCI/power logic 320. Instead of energizing the solenoid directly based on the fault signal output by GFCI/power logic 320, the circuit breaker 320 causes any fault signals output by GFCI/power logic 320 to be diverted to control sensing interface 316, which carries fault signals output by the GFCI/power logic 320 to a trip control loop (e.g., the trip control logic 124 on measurement and control board 120). The trip control logic 124, outside of the circuit breaker 302, determines whether to trip the circuit breaker 302 depending on the tripping option (e.g., a default (e.g., overload) tripping option, an AFCI tripping option, a GFCI tripping option, and a AFCI/GFCI tripping option) selected for the selected for the circuit breaker 302. The tripping option for the circuit breaker 302 can be adjusted as needed (external to and separate from the fault detection capabilities of the circuit breaker 302) by configuring the trip control logic 124. In other words, the circuit breaker 302 is able to detect fault conditions for all of the tripping options available, but it is the trip control loop (external to the circuit breaker 302) that determines whether to ignore a detected fault or to trip the mechanical components 304 in response to a detected fault.

For example, the trip control logic 124 (external to the circuit breaker 302) may be set to cause the circuit breaker 302 to operate using the default tripping option. With the default tripping option, all fault conditions (overload, AFCI, GFCI) detected by the GFCI logic 320 will be diverted to the trip control logic 124. In response, the trip control logic 124 will cause the solenoid 312 to be energized for overload detection, but not for AFCI detection nor for GFCI detection. With the AFCI tripping option, all fault conditions detected by the GFCI logic 320 will be diverted to the trip control logic 124. In response, the trip control logic 124 will cause the solenoid 312 to be energized for overload detection or for AFCI detection, but not for GFCI detection. With the GFCI tripping option, all fault conditions detected by the GFCI logic 320 will be diverted to the trip control logic 124. In response, the trip control logic 124 will cause the solenoid 312 to be energized for overload detection or for GFCI detection, but not for AFCI detection. With the AFCI/GFCI tripping option, all fault conditions detected by the GFCI logic 320 will be diverted to the trip control logic 124. In response, the trip control logic 124 will cause the solenoid 312 to be energized for overload detection, for AFCI detection, or for GFCI detection.

As shown, the circuit breaker 302 also comprises self-test circuitry 312 coupled to the control sensing interface 316. The self-test circuitry 312 enables test signals to be sent to the trip control logic 124 via the control sensing interface to test the overall functionality of the circuit breaker 302 and the trip control logic 124. The self-test circuitry 312 is operated by pressing a button or other contact accessible on the outer surface of the circuit breaker 302. The outer surface of the circuit breaker 302 also includes contact points (e.g., slide connectors and/or screws connectors) for the line bus bar and the neutral bus bar.

To summarize, system 100 describes a control system for a circuit breaker panel. The control system is divided such that fault detection logic is provided within each circuit breaker and trip control logic is provided external to each circuit breaker. In at least some embodiments, the fault detection logic within each circuit breaker is able to detect an overload condition, an AFCI condition, and a GFCI condition. Meanwhile, the trip control logic external to each circuit breaker is able to provide a default tripping option (overload only), an AFCI tripping option (overload and AFCI only), a GFCI tripping option (overload and GFCI only), and a AFCI/GFCI tripping option (overload, AFCI, and GFCI) in response to detected faults.

The control system for a circuit breaker panel also may comprise a user interface in communication with the trip control logic. The user interface enables a user to view power consumption information for the circuit breaker panel and/or to adjust each of the plurality of circuit breakers to operate with one of the default tripping option, the AFCI tripping option, the GFCI tripping option, and the AFCI/GFCI tripping option. The control system for a circuit breaker panel also may comprise a utility metering interface coupled to the plurality of circuit breakers. The utility metering logic selectively transmits power consumption information for the circuit breaker panel to a utility company and may enable the utility company to selectively disable each of the circuit breakers. The control system for a circuit breaker panel also may comprise a networking interface that provides multimedia features for a home area network (HAN) and/or an endpoint communications interface that enables communications between appliances/receptacles and the circuit breaker panel.

The number of circuit breakers in a circuit breaker panel box may vary according to the size of the home/business for which the circuit breaker panel box is intended and/or government regulations. In accordance with at least some embodiments, the circuit breaker panel box models may have 4, 6, 8, 12, 16, 20, 40 or more circuit breakers. As the number of circuit breakers includes, the amount of trip control loop circuitry also increases. In other words, the trip control loop circuit described herein may implement a control chip compatible with a predetermined number of circuit breakers (e.g., 8). If the number of circuit breakers is greater than the predetermined number, the number of control chips is increased. As needed, multiple control chips may be daisy-chained with regard to communications being received to the circuit breaker panel box or communications being transmitted from a circuit breaker panel box.

Embodiments of circuit breaker panel boxes may vary with respect to the number of circuit breakers, the positioning of circuit breakers (e.g., vertical or horizontal), the use of a display and/or LEDs, the size and location of a display, the software configuration, the cross bar position/shape, the use of a meter, the location of the meter, the use of an antenna for wireless communications, the wireless frequency and protocol, and the ability to communicate with utility company devices for measurements, logging, and remote control of circuit breakers. In some embodiments, the various features of a circuit breaker panel box are available for selection by a customer, but not required. Further, the selection of AFCI and/or GFCI is optional for each circuit breaker.

In some embodiments, the control circuitry of a circuit breaker panel box is capable of supporting all the features described herein. However, not all the features need be selected by each customer and thus the implementation of circuit breaker panel boxes may vary. Further, a customer may later decide to upgrade circuit panel boxes (e.g., add a display, upgrade software, add wireless communications, etc.) without having to replace the entire circuit breaker panel box.

In some embodiments, TV, Ethernet and/or Cable will be able to connect to the circuit breaker panel box without regard to the utility company. For example, plugs/ports and related protocols may be implemented with the circuit breaker panel box to achieve this added functionality. Further, the communications for TV, Ethernet and/or Cable may be accomplished via the power line or wireless hardware/protocols. In the home/business, an appropriate adapter/modem may be implemented to convert signals as needed.

In accordance with at least some embodiments, circuit breaker panel box embodiments are configured to provide one or more of: 1) a design that enables circuit breakers to plug into both the hot (line) and neutral bus bars without wires; 2) a touch screen; 3) programmability so that voltage and safety requirements (e.g., GFCI/AFCI) can be programmed into each circuit breaker from a user interface in the circuit breaker panel box; 4) mitigation of shock from a live wire; 5) enabling an end user to monitor power consumption per appliance in real-time; 6) the ability to program GFCI and AFCI on all wired pathways; 7) programmability of appliance consumption at the circuit breaker panel box or remotely; 8) an automatic soft start feature that eliminates spikes in power during restart.

In accordance with at least some embodiments, each circuit breaker is configured to provide one or more of: 1) eliminate separate metering and related maintenance costs; 2) remote monitoring/reading of power consumption; 3) remote shut off and turn on; 4) alerts to the utility company regarding theft of power at the home level and/or to automatically shut down in response to a theft event; 5) enable the utility company to control consumption at the home level at a per-breaker level; 6) functionality with any broadband over power line (BPL) network, mesh network, or other wired or wireless network; 7) eliminate the need for different meters if the utility company installs more than one communication interface or meter (depends on whether utility company upgrades); 8) act as an open source Gateway into the home or office providing the utility company with additional income sources after a BPL network has been installed; 9) eliminates labor intensive manual meter reading and associated costs.

In accordance with at least some embodiments, a circuit breaker panel box that operates as breaker/meter Gateway Profit Center is configured to provide one or more of: 1) an open source Gateway into and out of the home or office; 2) an open architecture that adapts to any communications software; 3) software that allows a communications customer such as an Internet provider or telephone provider to connect directly to the circuit breaker panel box or to enable the electric utility company to provide service to the end user; 4) eliminating internal home or office wiring or cabling once the box is connected; 5) enabling an end user to plug a TV or computer into the standard home or office receptacle and receive the communications delivered by the provide; 6) enabling the utility company to profit by using the BPL capability as well as connectivity features of the circuit breaker panel box to third party commercial companies; 7) allowing third party access to the home without wiring inside the home or office (the system allows communications delivery from standard electrical wiring inside the home or office); and 8) supporting remote upgrades from third parties while being completely safe with channel protection which provides a wall between the utility company and any third party application at the home or office level.

Figure 4:
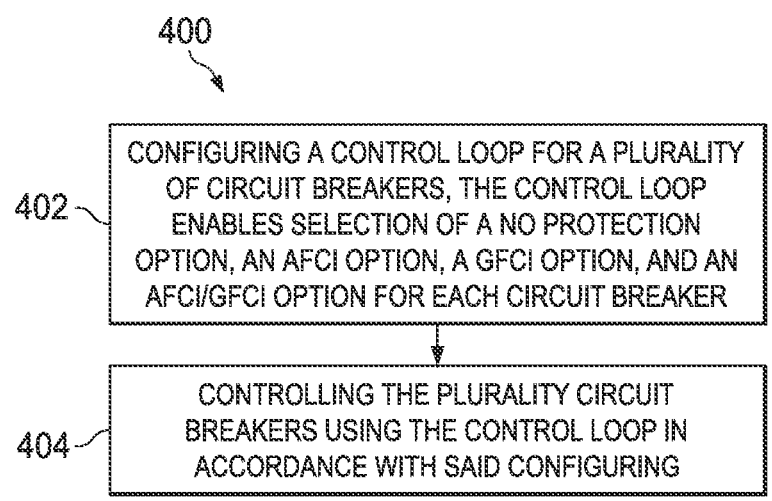
FIG. 4 shows a method in accordance with an embodiment of the disclosure.

FIG. 4 shows a method 400 in accordance with an embodiment of the disclosure. The method 400 comprises configuring a control loop for a plurality of circuit breakers, where the control loop enables selection of a default protection option, an AFCI option, a GFCI protection option, and an AFCI/GFCI protection option (block 402). The method 400 also comprises controlling the plurality of circuit breakers using the control loop in accordance with the previous configuring (block 404).

In at least some embodiments, the method 400 may additionally comprise receiving user input to set each of the plurality of circuit breakers to operate with one of the default tripping option, the AFCI tripping option, the GFCI tripping option, and the AFCI/GFCI tripping option. Additionally or alternatively, the method 400 may comprise receiving communications from a utility provider to remotely monitor and to control the plurality of circuit breakers. Additionally or alternatively, the method 400 may comprise managing home area network (HAN) communication features via the circuit breaker panel. Additionally or alternatively, the method 400 may comprise managing communications between a user and electrical appliances via the circuit breaker panel. Additionally or alternatively, the method 400 may comprise receiving multimedia transmissions via the circuit breaker panel.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
a plurality of circuit breakers, each circuit breaker comprising circuitry for detecting faults on a corresponding electrical circuit and in response generate a fault signal identifying a detected fault as an overload, an arc fault circuit interrupt (AFCI), or ground fault circuit interrupt (GFCI); and
trip control logic external to and coupled to the circuit breakers for receiving a fault signal from a selected circuit breakers and in response selectively enabling tripping of the selected circuit breaker in accordance with a tripping option preselected for the selected circuit breaker from among default overload, AFCI, GFCI and AFCI/GFCI tripping options.

2. The system of claim 1 further comprising utility metering logic coupled to the plurality of circuit breakers, wherein the utility metering logic determines power consumption information for the system and formats the information for transmission to a utility metering collection site.

3. The system of claim 1 further comprising a user interface in communication with the trip control logic, wherein the user interface enables a user to preselect one of the plurality of different tripping options for each of the plurality of circuit breakers.

4. The system of claim 3 wherein the user interface comprises a touch screen.

5. The system of claim 3 further comprising an endpoint communication interface coupled to the user interface, wherein the endpoint communication interface enables a user to communicate with electrical appliances or with electrical receptacles via the user interface.

6. The system of claim 1 further comprising a communication interface coupled to the trip control logic, wherein the communication interface enables an electric utility provider to remotely trip each of the plurality of circuit breakers separately.

7. The system of claim 1 further comprising a communication interface that enables multimedia transmissions to be received via a circuit breaker panel for the system.

8. The system of claim 1 wherein the circuit breakers connect directly to both a line-side bus bar and to a neutral side bus bar without use of wires for the connection.

9. The system of claim 1, wherein the trip control logic:
in accordance with the default overload tripping option, enables tripping of the selected circuit breaker when the received fault signal identifies a detected fault as an overload on the corresponding electrical circuit;
in accordance with the AFCI tripping option, enables tripping of the selected circuit breaker when the received fault signal identifies a detected fault as either an AFCI or a overload on the corresponding electrical circuit;
in accordance with the GFCI option, enables tripping of the selected circuit breaker when the received fault signal identifies a detected fault as either a GFCI or a overload on the corresponding electrical circuit; and
in accordance with the AFCI/GFCI option, enables tripping of the corresponding circuit breaker when the received fault signal identifies a detected fault as either an AFCI, a GFCI, or an overload on the corresponding electrical circuit.

10. The system of claim 1 wherein the circuitry for detecting faults comprises:
a power sensor circuit for detecting overload events on the corresponding electrical circuit;
a GFCI/AFCI sensor for detecting AFCI and GFCI events on the corresponding electrical circuit; and
logic for identifying an overload, AFCI, or GFCI event detected by the power and GFCI/AFCI sensors and in response generating a corresponding fault signal for transmission to the trip control logic.

11. The system of claim 10, further comprising high signal-to-noise ratio, low impedance interface circuitry coupling the GFCI/AFCI sensor and the logic for identifying.

12. A circuit breaker panel, the circuit breaker panel comprising:
fault detection logic within each of a plurality of circuit breakers associated with the circuit breaker panel for generating a fault detection signal identifying a fault detected on a corresponding electrical circuit as an overload, an arc fault circuit interrupt (AFCI) or ground fault circuit interrupt (GFCI); and
trip control logic coupled to each fault detection logic and located exterior to the plurality of circuit breakers, wherein the trip control logic enables tripping of a corresponding circuit breaker in response to a received fault detection signal in accordance with one of a plurality of different tripping options selected for the corresponding circuit breaker, the plurality of different tripping options including default overload, AFCI, GFCI and AFCI/GFCI tripping options.

13. The circuit breaker panel of claim 12 further comprising a line-side bus bar and a neutral side bus bar, wherein the plurality of circuit breakers connect directly to the line-side bus bar and the neutral side bus bar without use of wires.

14. The circuit breaker panel of claim 12 further comprising a user interface coupled to the trip control logic, wherein the user interface enables a user to view power consumption information for the circuit breaker panel and to select one of the different tripping options for each of the plurality of circuit breakers.

15. The circuit breaker panel of claim 12 further comprising a networking interface that provides multimedia features for a home area network (HAN) and an endpoint communications interface that enables communications between appliances and a user.

16. The circuit breaker panel of claim 12, wherein the trip control logic:
in accordance with the default overload option, enables tripping of the selected circuit breaker when the received fault signal identifies a detected fault as an overload event on the corresponding electrical circuit;
in accordance with the AFCI tripping option, enables tripping of the selected circuit breaker when the received fault signal identifies a detected fault as either an AFCI or a overload on the corresponding electrical circuit;
in accordance with the GFCI option, enables tripping of the selected circuit breaker when the received fault signal identifies a detected fault as either a GFCI or an overload on the corresponding electrical circuit; and
in accordance with the AFCI/GFCI option, enables tripping of the corresponding circuit breaker when the received fault signal identifies a detected fault as either an AFCI, a GFCI, or an overload on the corresponding electrical circuit.

17. The circuit breaker panel of claim 12, wherein the fault detection logic comprises:
a power sensor circuit for detecting overload events on the corresponding electrical circuit;
a GFCI/AFCI sensor for detecting AFCI and GFCI events on the corresponding electrical circuit; and
logic for identifying an overload, AFCI, or GFCI event detected by the power and GFCI/AFCI sensors and in response generating a corresponding fault signal for transmission to the trip control logic.

18. The circuits breaker panel of claim 17, further comprising high signal-to-noise ratio, low impedance interface circuitry coupling the GFCI/AFCI sensor and the logic for identifying.

* * * * *